United States Patent Office 3,415,850
Patented Dec. 10, 1968

3,415,850
PREPARATION OF BENZOQUINONES
AND HYDROQUINONES
Calvin J. Worrel, Detroit, Mich., and Robert L. McLean, West Chicago, Ill., assignors to Ethyl Corporation, New York, N.Y., a corporation of Virginia
No Drawing. Filed Sept. 24, 1964, Ser. No. 399,077
13 Claims. (Cl. 260—396)

ABSTRACT OF THE DISCLOSURE

Otho-alkyl benzoquinones are prepared by oxidizing an ortho-alkyl nitrosophenol with a chemical oxidant having an oxidation potential below −0.40. The benzoquinones can be reduced to hydroquinones which are useful antioxidants.

This invention relates to a process for producing ortho alkylated benzoquinones. This invention relates further to a process for producing ortho alkylated hydroquinones. In particular, this invention relates to a process of producing benzoquinones by the oxidation of ortho alkylated nitrosophenols and to the reduction of the benzoquinones so produced to the corresponding ortho alkylated hydroquinones.

The benzoquinones and hydroquinones produced by this process are reactive chemical intermediates and have the many utilities known for this type of compound. The benzoquinones produced by this process, for example, are easily reduced to hydroquinones and can, therefore, function in organic reactions as oxidizing agents. The hydroquinones produced by the process of this invention are useful as antioxidants in organic media, such as gasoline, plastics, rubber, and the like. The hydroquinones can also be used as reducing agents in chemical reactions. Furthermore, the hydroquinones can be converted to other useful compounds such as antioxidants. For example, 2-tert-butyl-hydroquinone is readily methylated by dimethylsulfate to yield 2-tert-butyl-4-methoxyphenol, a valuable food antioxidant.

In the past, the use of these compounds has been curtailed by their general unavailability and high cost of preparation. This is particularly true of 2,6-di-alkyl-benzoquinones and hydroquinones. The preparation of these compounds has been accomplished only by involved and indirect routes requiring expensive reagents and starting materials.

One of the most formidable problems involved in the preparation of 2,6-di-alkyl-para-benzoquinones is that the oxidation routes known in the art lead to extensive by-product formation. Thus, for example, in the prior art methods, the oxidation of 2,6-di-tert-butylphenol leads primarily to 3,3′,5,5′ - tetra - tert-butyl-diphenoquinone. Furthermore, the prior art methods for the oxidation of such commercial compounds as 2,6-di-tert-butyl-4-methylphenol (known in the trade as "Ionol") leads to the formation of extensive amounts of products such as 3,5-di-tert-butyl-para-hydroxybenzaldehyde, 1,2 - bis(3,5-di-tert-butyl-4-hydroxyphenol)ethane, and 3,3′,5,5′ - tetra-tert-butylstilbene - 4,4′ - benzoquinone; M. S. Kharasch et al., J. Org. Chem., 22, 1439–43 (1957).

Some of the prior art methods of preparing benzoquinones or hydroquinones are based upon the reaction of alkali metal hydroxides with halophenols at high temperatures. Unfortunately, these processes are not readily applicable to complex phenols and, in particular, they are not readily applicable to 2,6-dialkylated phenols because the elevated temperatures required lead to extensive rearrangement and decomposition.

There exists, therefore, a need for a precess capable of converting complex phenols to benzoquinones in high yields without extensive contamination with decomposition products. This invention satisfies that need.

An object of this invention is to provide a novel method for the preparation of benzoquinones. Another object is to provide a process for the preparation of para-benzoquinones. A further object is to provide a process for the preparation of alpha-branched ortho alkylated para-benzoquinones. A particular object of this invention is to provide a process ideally suited for the preparation of 2,6-di-tert-butyl-para-benzoquinone. Other objects will be apparent from the following detailed description and appended claims.

The objects of this invention are accomplished by providing a process for producing an ortho alkylated benzoquinone, which comprises the reaction of an ortho alkylated nitrosophenol with chemical oxidizing means. An ortho alkylated benzoquinone is an ortho or para benzoquinone in which at least one position in the quinone ring adjacent to a carbon atom having a quinone oxygen bonded thereto is substituted with an alkyl radical, as hereinafter defined. A preferred embodiment of the present invention is a process which comprises the reaction of an ortho alkylated paranitrosophenol with chemical oxidizing means. A more preferred embodiment is a process which comprises the reaction of an ortho alkylated para-nitrosophenol with chemical oxidizing means in an aqueous acidc reaction medium. A most preferred embodiment of this invention is the reaction of 2,6-di-tert-butyl-4-nitrosophenol with sodium dichromate in an aqueous acidic reaction medium to produce 2,6-di-tert-butyl-para-benzoquinone.

Other researchers have attempted the oxidation of nitrosophenols substituted in an ortho position with alpha-branched alkyl groups, but have obtained products altogether different than the the benzoquinones formed according to the present invention. For example, M. S. Kharasch et al., J. Org. Chem., 27, p. 651 (1962), reports that the oxidation of 2,6-di-tert-butyl-4-nitrosophenol, a sterically hindered phenol, yields a tri-nuclear compound melting at 141–2° C. and having an empirical formula of $C_{42}H_{60}O_5N_2$. According to the present invention, sterically hindered nitrosophenols are oxidized to benzoquinones by reacting the nitrosophenol with chemical oxidizing means.

Nitrosophenols suitable for use in this process are phenolic compounds wherein a nitroso radical is bonded to a carbon atom in a benzene ring which is bonded to a hydroxyl group. Current theory teaches that nitrosophenols exist as an equilibrium mixture of a nitrosophenol and an oxime, as illustrated below.

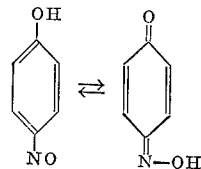

However, it is to be understood that this invention is independent of the state or equilibrium in which the particular nitrosophenol might exist.

Although the present invention is operable on nitrosophenols containing a fused benzene ring system, it is particularly adapted to the conversion of mononuclear nitrosophenols to the corresponding benzoquinone. The preferred nitrosophenols used in this invention are, therefore, mononuclear nitrosophenols; that is, the hydroxyl radical and the nitroso radical are bonded to an isolated benzene ring.

The present invention is operable on either ortho- or para-nitrosophenols. When ortho-nitrosophenols are subject to the process of this invention, the resultant benzoquinone is an ortho-benzoquinone. Similarly, when para-nitrosophenols are subject to the process of this invention, the resultant product is a para-benzoquinone. The more preferred nitrosophenols of this invention are para-nitrosophenols. In general, the para-benzoquinones produced from them have been found to have greater utility.

Highly preferred nitrosophenols of this invention are mononuclear para-nitrosophenols in which at least one position ortho to the phenolic hydroxyl radical is substituted with an alpha-branched alkyl or aralkyl group. Such nitrosophenols have the formula:

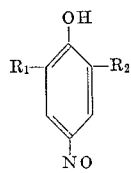

wherein $R_1$ and $R_2$ are the same or different radicals and are selected from the group consisting of hydrogen, secondary or tertiary alkyl radicals containing 3 to 12 carbon atoms, cycloalkyl radicals containing 3 to 12 carbon atoms, or aralkyl radicals containing 3 to 12 carbon atoms, such that at least one of the radicals is an alkyl, cycloalkyl or aralkyl radical. Such radicals other than hydrogen are frequently referred to as alpha-branched radicals in that the carbon atom in the position adjacent to the benzene ring has a side chain branch containing at least one carbon atom. Examples of such radicals are isopropyl, sec-butyl, tert-butyl, sec-amyl, sec-isoamyl, tert-amyl, sec-hexyls, tert-hexyls, sec-dodecyls, tert-dodecyls, cyclopropyl, cyclopentyl, cyclohexyl, $\alpha$-methylbenzyl, $\alpha,\alpha$-dimethylbenzyl, 4-isopropyl-$\alpha,\alpha$-dimethylbenzyl, and the like. In a most preferred nitrosophenol of this invention $R_1$ and $R_2$ are both tert-butyl groups, resulting in the compound 2,6-di-tert-butyl-4-nitrosophenol. It is with nitrosophenols such as this, wherein many prior art processes cause decomposition or rearrangement of the alkyl substituent, that the present invention is most useful.

The nitrosophenols used in this invention may be prepared by any of the several methods already known in the art. For example, nitrosyl chloride reacts readily with phenolic compounds having an open para position to yield para-nitrosophenols (Moyer, U.S. 2,074,127, March 1937). The procedure most frequently used is the reaction of nitrous acid with phenolic compounds having an unsubstituted ortho or para position. A facile method of effecting this reaction is to dissolve the phenolic compound in a suitable solvent, such as an alcohol, and add thereto a stoichiometric quantity of sodium nitrite. Following this, an aqueous solution of sulphuric acid is gradually added to convert the sodium nitrite to nitrous acid which nitrosates the phenol. Preferably, the temperature is maintained between 0 and 10° C. during this addition. The nitrosophenol produced in this manner is usually insoluble in the reaction medium and precipitates therefrom.

The chemical oxidizing means suitable for use with this invention are the chemical oxidizing agents commonly used in the art to effect oxidation. In the broadest sense, an oxidizing agent is a chemical reagent which causes oxidation of other substances and is thereby reduced. The oxidizing agents used in the present process are more limited than this in that they include only those oxidizing agents that are capable of introducing an oxygen atom into nitrosophenols. The source of the oxygen atom may be the oxidizing agent itself or it may be a third component which enters into the reaction, such as an aqueous acidic reaction medium in which the oxidation is carried out. Examples of this second class of oxidizing agent which derives its oxygen from a third component are lead tetraacetate, stannic chloride, ceric sulfate or ferric chloride.

The more preferred oxidizing agents used in this invention are compounds containing a readily reducible element in such a form as to have a standard oxidation potential of less than about —0.40. Examples of these preferred oxidizing agents having a standard oxidation potential below about —0.40 are given by W. M. Latimer, "Oxidation Potentials," 339–348, second edition (1952), Prentice-Hall, Inc., Englewood, N.J. In the above reference, Latimer lists the oxidizing agents according to their standard oxidation potential in the form of their half-cell reaction. Many of the half-cell reactions listed give only one ion of an anioncation pair, and it will be obvious to a skilled practitioner to supply the required counter ion when only one of the ion pair is shown in the half-cell reaction. Some examples of preferred oxidizing agents listed in the Latimer reference are the dichromate ion (used in the form of sodium dichromate or potassium dichromate in aqueous acidic solvents), the permanganate ion (used in the form of potassium permanganate) or the ferric ion (usually employed in the form of ferric chloride). The most preferred chemical oxidizing agents in the present process are potassium dichromate or sodium dichromate.

The preferred quantity of chemical oxidizing agent employed in the practice of this invention is dependent upon the particular chemical oxidizing agent used. On a mole basis some oxidizing agents have greater oxidizing capacity than others. Thus, when sodium dichromate is employed, wherein each chromium atom gains three electrons during the oxidation of the nitrosophenol, a preferred mole ratio of nitrosophenol to oxidizing agent is from about 4 to1 to about 0.5 to 1. A more preferred range is from about 3 to 1 to about 1.5 to 1, and a most preferred range has been found to be from about 1.8 to 1 to about 1.5 to 1. When oxidizing agents are employed having a greater molar oxidizing capacity than sodium dichromate proportionately less oxidizing agent on a molar basis is required and, in like manner, when oxidizing agents having less oxidizing capacity are employed a proportionately greater amount will be required.

Although a solvent is not required in the present invention the process is preferably carried out in a liquid reaction medium. Such liquid reaction media facilitate heat exchange and agitation of the reactants. Most para-nitrosophenol reactants are relatively high melting materials and, thus, it would not be practical nor necessary to carry the present reaction out under the conditions that would be required to convert the nitrosophenol reactant to the liquid state. Therefore, the present process is preferably carried out in the presence of a liquid reaction medium.

A frequent function of the reaction medium is to enter into the oxidation-reduction reaction together with the oxidizing agent. For example, when oxidizing with sodium dichromate, we prefer to include in the reaction about 8 to 12 equivalents of acid per mole of sodium dichromate. Thus, a more preferred reaction medium is an aqueous acidic reaction medium. Suitable acids are water soluble acids capable of maintaining the pH of the reaction medium below about 5.0. The more preferred acids are the low molecular weight monobasic organic acids or the readily available strong mineral acids. Examples of suitable organic acids include acetic and propionic. A most preferred organic acid suitable for use in this invention is acetic acid. Examples of suitable mineral acids include hydrochloric, sulphuric, orthophosphoric, metaphosphoric, nitric, and the like. A most preferred reaction medium when using an oxidizing agent that requires acid participation, such as sodium dichromate, is aqueous sulphuric or acetic acid.

When the present invention is carried out in an aqueous acidic reaction medium composed of an aqueous solution of a strong acid, such as sulphuric acid, a preferred acid concentration range is from about 5 to about 95 weight percent. A more preferred acid range is from about 10 to about 20 weight percent and a most preferred acid range is from about 10 to about 15 weight percent. When the aqueous acidic reaction medium consists of an aqueous solution of a weak acid, such as acetic acid, a preferred acid range is from about 25 to about 100 weight percent. A more preferred range when using a weak acid is from about 25 to about 75 weight percent, and a most preferred range is from about 40 to about 60 weight percent.

The reaction medium may contain a solubilizing agent which either causes all of the reactants to enter into a single phase or at least causes a part of all of the reactants to be present in a single phase. Examples of such solubilizing agents are acetone, methylethylketone, isopropanol, dimethylformamide, dimethyl Cellosolve or dimethyl Carbitol. In most instances, the present process proceeds readily without requiring a solubilizing agent.

The quantity of reaction medium employed should be sufficient to suspend the solid para nitrosophenol reactant and, when using a chemical oxidizing agent such as sodium dichromate, it should also contain enough acid to allow the oxidizing agent to function. Generally, a quantity of reaction medium equal to about 2 to 15 times the weight of the para nitroso reactant is sufficient. A most preferred quantity of reaction medium is from about 5 to about 10 times the weight of the para nitrosophenol.

The temperature at which the process is carried out should be high enough to promote a rapid oxidation rate, but not so high as to cause decomposition of the reactants or products. Under most conditions a temperature within the range of from about 25 to about 125° C. will suffice. A more preferred temperature range is from 50 to 125° C. A most preferred temperature range when using an aqueous acidic reaction medium is the reflux temperature of the reaction mass. Under these conditions the oxidation usually proceeds at a rapid rate with substantially no decomposition of reactants or products. Furthermore, the condensation of the refluxing condensate furnishes a facile method of controlling temperature.

The time required to complete the oxidation of the nitrosophenol to the corresponding benzoquinone is dependent upon the particular nitrosophenol employed, the temperature at which the oxidation is carried out, and the strength of the particular chemical oxidizing agent used. In general, shorter reaction times will be required at higher temperatures and with stronger oxidants. In most cases the reaction will be complete in from 0.5 to 24 hours. A more preferred reaction time is from 1 to 4 hours, and a most preferred reaction time is from 1 to 2 hours. In most cases this reaction period will lead to maximum yields of the desired benzoquinone.

The following examples demonstrate the methods of conducting the process of this invention. All parts are parts by weight unless otherwise specified.

EXAMPLE I

In a reaction vessel, equipped with agitator, thermometer and reflux condenser, was placed:

5 parts 2,6-di-tert-buty-4-nitrosophenol
40 parts water
8.1 parts sulphuric acid
A solution of 3.68 parts sodium dichromate dihydrate in 10.3 parts water The two-phased mixture was refluxed overnight and then steam distilled, yielding 3.62 parts 2,6-di-tert-butyl-para-benzoquinone (M.P. 58–61° F.). This is equivalent to a 77.5 percent yield based on 2,6-di-tert-butyl-para-nitrosophenol.

When equal mole quantities of other nitrosophenols are employed in the above example equally good results are obtained.

Other nitrosophenols can be employed in the above example. For example, when 2-isopropyl-4-nitrosophenol is used, o-isopropyl-para-benzoquinone is obtained. When 2,6-isopropyl-4-nitrosophenol is employed, 2,6-di-isopropyl-para-benzoquinone, is obtained. When 2-cyclohexyl-4-nitrosophenol is used in the above example, 2-cyclohexyl-para-benzoquinone is obtained in excellent yield. When 2,6-di-sec-dodecyl-4-nitrosophenol is employed, 2,6-di-sec-dodecyl-para-benzoquinone is obtained. The use of 2-sec-butyl-4-nitrosophenol results in the formation of 2-sec-butyl-para-benzoquinone. The use of 2,6-di-sec-butyl-4-nitrosophenol leads to the formation of 2,6-di-sec-butyl-para-benzoquinone. Likewise, the use of 2-($\alpha$-methylbenzyl)-4-nitrosophenol yields 2-($\alpha$-methylbenzyl)-para-benzoquinone. When 2,6-di-($\alpha$-methylbenzyl)-4-nitrosophenol is employed, 2,6-di-($\alpha$-methylbenzyl)-para-benzoquinone is obtained in good yield.

EXAMPLE II

To a reaction vessel as described in Example I was charged:

| | Parts |
|---|---|
| 2,6-di-tert-butyl-4-nitrosophenol | 5 |
| Water | 50 |
| Sulphuric acid | 8.1 |
| Sodium dichromate dihydrate | 7.4 |

The mixture was refluxed for 4 hours and then steam distilled, yielding 2,6-di-tert-butyl-para-benzoquinone in quantities equivalent to a 77 percent yield.

EXAMPLE III

To a reaction vessel equipped as in Example I was charged:

| | Parts |
|---|---|
| 2,6-di-tert-butyl-4-nitrosophenol | 5 |
| Water | 50 |
| Sulphuric acid | 8.1 |
| Sodium dichromate dihydrate | 4.2 |

The mixture was refluxed for 2 hours and then steam distilled, yielding 2,6-di-tert-butyl-para-benzoquinone in a 77 percent yield.

Another experiment was carried out in an identical manner to the above example except that 2.1 parts of sodium dichromate dihydrate was employed. The product, 2,6-di-tert-butyl-para-benzoquinone, was obtained in 66 percent yield.

EXAMPLE IV

To a reaction vessel as described in Example I was charged:

| | Parts |
|---|---|
| 2,6-di-tert-butyl-4-nitrosophenol | 10 |
| Water | 50 |
| Sulphuric acid | 8.1 |
| Sodium dichromate dihydrate | 7.4 |

The mixture was refluxed 1 hour and then steam distilled. The product, 2,6-di-tert-butyl-para-benzoquinone, was obtained in 71.5 percent yield.

EXAMPLE V

To a reaction vessel as described in Example I was charged:

| | Parts |
|---|---|
| 2,6-di-tert-butyl-4-nitrosophenol | 5 |
| Water | 50 |
| Sulphuric acid | 4 |
| Sodium dichromate dihydrate | 4.2 |

The mixture was refluxed 2 hours and then steam distilled. The product, 2,6-di-tert-butyl-para-benzoquinone, was obtained in 70.5 percent yield.

EXAMPLE VI

To a reaction vessel as described in Example I was charged:

| | Parts |
|---|---|
| 2,6-di-tert-butyl-4-nitrosophenol | 5 |
| Acetic acid | 20 |
| Sodium dichromate dihydrate | 3.7 |

The mixture was refluxed 2.5 hours and then steam distilled. The product, 2,6-di-tert-butyl-para-benzoquinone, was obtained in 63 percent yield.

EXAMPLE VII

To a reaction vessel as described in Example I was charged:

| | Parts |
|---|---|
| 2,6-di-tert-butyl-4-nitrosophenol | 5 |
| Water | 15 |
| Acetic acid | 15 |
| Sodium dichromate dihydrate | 4.2 |

The mixture was refluxed for 2 hours and then steam distilled. The product, 2,6-di-tert-butyl-para-benzoquinone, was obtained in 81 percent yield.

EXAMPLE VIII

To a reaction vessel as described in Example I was charged:

| | Parts |
|---|---|
| 2,6-di-tert-butyl-4-nitrosophenol | 5 |
| Sulphuric acid | 1.9 |
| Sodium dichromate dihydrate | 3.7 |
| Dimethyl formamide | 20 |

The mixture was agitated for 20 hours at a temperature of 25° C. Following this, it was steam distilled, yielding 2,6-di-tert-butyl-para-benzoquinone in 62 percent yield.

EXAMPLE IX

To a reaction vessel as described in Example I is charged:

| | Parts |
|---|---|
| 2-nitroso-4,6-di-tert-butylphenol | 5 |
| Potassium permanganate | 2.4 |
| 50 percent aqueous acetic acid | 15 |

The mixture is agitated for 8 hours at reflux and then steam distilled, yielding 2,4-di-tert-butyl-o-benzoquinone in good yield.

Equal mole quantities of other ortho-nitrosophenols can be used in the above example. For example, the use of 2-nitroso-6-tert-butylphenol results in the formation of 2-tert-butyl-o-benzoquinone. The use of 2-nitroso-4,6-di-isopropyl phenol leads to the formation of 2,4-di-isopropyl-o-benzoquinone. When 2-nitroso-6-cyclohexylphenol is used, 2-cyclohexyl-o-benzoquinone is produced in good yield. The use of 2-nitroso-6-sec-dodecylphenol leads to the formation of 2-sec-dodecyl-o-benzoquinone.

EXAMPLE X

To a reaction vessel as described in Example I is charged:

| | Parts |
|---|---|
| 2-isopropyl-4-nitrosophenol | 3.8 |
| Potassium chlorate | 1.5 |
| 10 percent aqueous sulphuric acid | 25 |

The mixture is refluxed for 1 hour and then steam distilled, yielding 2-isopropyl-para-benzoquinone in good yield.

An equivalent amount based upon molecular weight and relative oxidative strength of other chemical oxidizing agents can be employed in the above example. For example, excellent results are obtained when 1.3 parts sodium perchlorate, 8.9 parts lead dioxide or 2.6 parts of 63 percent nitric acid are used.

EXAMPLE XI

To a reaction vessel as described in Example I is charged:

| | Parts |
|---|---|
| 2-tert-butyl-4-nitrosophenol | 3.8 |
| Water | 50 |
| Sulphuric acid | 8.1 |
| Sodium dichromate dihydrate | 3.7 |

The mixture is refluxed for 2 hours and then steam distilled, yielding 2-tert-butyl-para-benzoquinone in good yield.

Another important embodiment of this invention is a process for producing a hydroquinone, which comprises reacting a nitrosophenol with chemical oxidizing means to produce a benzoquinone and subsequently reducing the benzoquinone thereby produced to the corresponding hydroquinone.

The preferred nitrosophenols and chemical oxidizing conditions employed in this embodiment of the present invention are the same as those previously set forth.

The benzoquinone need not be purified before carrying out the reduction step. However, in general, it is preferred to isolate and purify the benzoquinone prior to the reduction step because it is usually easier to purify the benzoquinone than the hydroquinone.

The reduction step may be carried out with chemical reducing means. Thus, a metal in combination with an acid can be used to effect the desired reduction. Metals that will react with acids to form hydrogen are employed. Typical metals of this type are zinc, iron, magnesium, aluminum, calcium, manganese, cadmium, and the like. The most preferred metals are zinc and iron.

The acids that can be used in the reduction step are those having sufficient acidity to react with the metal employed. Preferred acids are the mineral acids, such as hydrochloric, sulphuric, orthophosphoric, and the like. The most preferred acid is hydrochloric acid. When hydrochloric acid is employed in the reducing step, excellent yields of hydroquinone are obtained at comparatively low cost.

Other chemical reducing means may be employed in this process. Thus, sodium aluminum hydride, sodium hydride, sodium borohydride, and the like, can be employed. These chemicals are not preferred because they are comparatively expensive.

An especially preferred reducing means that can be used in this process is catalytic hydrogenation. In this embodiment the benzoquinone is usually dissolved in an inert solvent and contacted with hydrogen and a hydrogenation catalyst. In conducting this reduction, any of the solvents utilized in the oxidation step of this process may be employed. The preferred solvents useful in the reduction step of this process are alcohols such as methanol, ethanol, propanol and isopropanol; aromatic hydrocarbons such as benzene, toluene, xylene, and mixtures thereof; and aliphatic hydrocarbons such as pentane, hexanes, heptanes, octanes, nonanes and decanes. The more preferred solvents used in the reduction step of this process are aliphatic hydrocarbons. Aliphatic hydrocarbons containing from about 6 to about 10 carbon atoms are highly preferred. When these hydrocarbons are employed the reaction proceeds smoothly and, in many instances, the hydroquinone product is readily crystallized from the solvent.

Suitable hydrogenation catalysts are those commonly used in the art to catalyze the hydrogenation of organic compounds. Some examples of these include palladium chloride on charcoal, activated nickel, nickel-nickel oxide, platinum-platinum oxide, platinum on charcoal, copper chromite, Raney nickel, palladium, platinum black, palladium sponge, nickel, copper impregnated alumina, palladium black, activated alumina, Raney copper, chromium, vanadium, molybdenum, and the like. The more preferred catalysts used in the reduction step are platinum, palladium, Raney nickel, copper impregnated alumina and copper chromite. The most preferred hydrogenation catalysts used in the reduction step of this embodiment of the present invention is Raney nickel.

The catalytic hydrogenation may be carried out at atmospheric pressure or at elevated pressures. Higher pressures usually result in faster hydrogenation rates. Extremely high pressures are not required because the benzoquinones produced in the oxidation step of the present invention are readily reduced. A preferred hydrogenation pressure range is from atmospheric pressure to about 1000 p.s.i.g. A more preferred pressure range is from about 10 to 500 p.s.i.g. A most preferred hydrogenation pressure range is from about 15 to about 100 p.s.i.g.

The hydrogenation is carried out at a temperature high enough to promote the reduction of the benzoquinone, but not so high as to cause degradation of the reactants, reaction medium or products. A preferred temperature range is from about 25° to 150° C. A more preferred temperature range is from about 40° to about 100° C., and a most preferred temperature range is from about 60° to about 80° C.

The reaction time required to convert various benzoquinones to hydroquinones will vary according to the reduction conditions employed and the particular benzoquinone being reduced. Higher temperatures usually promote faster reductions. Furthermore, higher hydrogen pressures usually afford faster reduction rates. In general, the reduction is usually complete in less than 8 hours. A more preferred reaction time is from about 0.5 to 4 hours, and a most preferred reaction time is from about 0.5 to 1 hour.

The following examples combined with the previous examples serve to illustrate the embodiments of the present invention directed to a process for producing hydroquinones. All parts are parts by weight unless otherwise indicated.

EXAMPLE XII

To a reaction vessel, equipped with stirring means and temperature measuring means, was added a solution of 13.2 parts of 2,6-di-tert-butyl-benzoquinone, as prepared in Example I, in 44 parts of isopropanol. To this was added 16 parts of zinc dust. Following this, 25 parts of concentrated hydrochloric acid (37 percent) was added dropwise over a 13 minute period. An exothermic reaction caused the temperature to rise to 70° C. This was accompanied by a color change of yellow to red to colorless with some evolution of gas. The reaction was cooled to room temperature whereupon a white precipitate separated. Twenty-nine parts of isopropanol were added to dissolve the precipitate. The mixture was then filtered to remove the excess zinc and the filtrate added to ice water. Fine white needles precipitated which were collected, dried and identified as 2,6-di-tert-butyl-hydroquinone by its melting point of 114–116° C.

In like manner, other benzoquinones can be reduced by following the procedure of the above example. The use of para-benzoquinone obtained from the oxidation of para-nitrosophenol results in para-hydroquinone. The use of o-isopropyl-para-benzoquinone obtained from the oxidation of 2-isopropyl-4-nitrosophenol results in the formation of o-isopropyl-para-hydroquinone. Likewise, when 2-tert-butyl-para-benzoquinone obtained from the oxidation of 2-tert-butyl-4-nitrosophenol is employed, o-tert-butyl-para-hydroquinone is obtained. In like manner, when 2-tert-octyl-para-benzoquinone is used, 2-tert-octyl-para-hydroquinone is obtained. When 2,6-di-tert-dodecyl-para-benzoquinone is used, 2,6-di-tert-dodecyl-para-hydroquinone is obtained. In general, any of the benzoquinones discussed in the earlier embodiment of the present invention directed at a process for producing benzoquinones can be used.

EXAMPLE XIII

To a pressure reaction vessel, equipped with stirring means, temperature measuring means and a gas inlet tube, was added 110 parts mixed octanes, 22 parts 2,6-di-tert-butyl-para-benzoquinone and 1.5 parts Raney nickel. The vessel was then sealed and flushed with nitrogen. The vessel contents were then heated to 76° C. and the vessel pressure increased to 29 p.s.i.g. with hydrogen. While maintaining these conditions, the vessel was agitated for 35 minutes. After this reaction time, no further hydrogen up-take was observed. The vessel pressure was then vented and, while still warm, the vessel contents were filtered to remove the catalyst. On cooling to room temperature, 16.7 parts of fine white needles precipitated, which were identified as 2,6-di-tert-butyl-para-hydroquinone by its melting point of 114–116° C.

In like manner, other benzoquinones can be catalytically hydrogenated to yield the corresponding hydroquinone. Thus, the use of 2-tert-butyl-para-benzoquinone in the above example results in the formation of 2-tert-butyl-hydroquinone. In like manner, any of the benzoquinones disclosed in the earlier discussion of the embodiment of the present invention directed at a process for producing benzoquinones can be employed, resulting in the formation of the corresponding hydroquinone.

Having fully disclosed a process for the production of benzoquinones and a process for the production of hydroquinones and the great utility of the products derived therefrom, it is desired that the present invention be limited only within the spirit and scope of the following claims.

We claim:

1. A process for producing a benzoquinone substituted in an ortho position with an alpha-branched alkyl radical containing 3–12 carbon atoms, said process comprising reacting a nitrosophenol substituted in a position ortho to the hydroxyl group with an alpha-branched alkyl radical containing 3–12 carbon atoms with chemical oxidizing means having a standard oxidation potential less than about −0.40 at a temperature of from about 25 to 125° C. in an acidic reaction medium.

2. The process of claim 1 wherein said nitrosophenol is a para-nitrosophenol.

3. The process of claim 1 conducted in an aqueous acidic reaction medium.

4. The process of claim 3 wherein said reaction medium is aqueous acetic acid.

5. The process of claim 4 wherein said chemical oxidizing means is sodium dichromate.

6. The process of claim 3 wherein said reaction medium is aqueous sulphuric acid.

7. The process of claim 6 wherein said chemical oxidizing means is sodium dichromate.

8. A process for producing 2,6-di-tert-butyl-para-benzoquinone, said process comprising the reaction of 2,6-di-tert-butyl-4-nitrosophenol with sodium dichromate in an aqueous acidic reaction medium at a temperature of from about 25 to 125° C.

9. A process for producing 2-tert-butyl-para-benzoquinone, said process comprising the reaction of 2-tert-butyl-4-nitrosophenol with sodium dichromate in an aqueous acidic reaction medium at a temperature of from about 25 to 125° C.

10. A process for producing a hydroquinone substituted in an ortho position with an alpha-branched alkyl group containing 3–12 carbon atoms, said process comprising the steps of (A) reacting a nitrosophenol substituted in an ortho position with an alpha-branched alkyl group containing 3–12 carbon atoms with chemical oxidizing means having a standard oxidation potential less than about −0.40 at a temperature of from about 25 to 125° C. in an acidic reaction medium to produce a benzoquinone and (B) reacting said benzoquinone thereby produced with reducing means selected from the group consisting of chemical reducing agents and catalytic hydrogenation to produce a hydroquinone substituted in an ortho position with an alpha-branched alkyl radical containing 3–12 carbon atoms.

11. The process of claim 10 wherein said nitrosophenol is a para-nitrosophenol.

12. A process for producing 2,6-di-tert-butyl-hydroquinone, said process comprising the steps of (A) reacting 2,6-di-tert-butyl-4-nitrosophenol with sodium dichromate in an aqueous acidic reaction medium at a temperature of from about 25 to 125° C. to produce 2,6-di-tert-butyl-benzoquinone and (B) reacting the 2,6-di-tert-butyl-benzoquinone thereby produced with reducing means selected from the group consisting of chemical reducing agents and catalytic hydrogenation to form 2,6-di-tert-butyl-hydroquinone.

13. A process for producing 2-tert-butyl-hydroquinone, said process comprising the steps of (A) reacting 2-tert-butyl-4-nitrosophenol with sodium dichromate in an aqueous acidic reaction medium at a temperature of from about 25 to 125° C. to produce 2-tert-butyl-benzoquinone and (B) reacting the 2-tert-butyl-benzoquinone thereby produced with reducing means selected from the group consisting of chemical reducing agents and catalytic hydrogenation to form 2-tert-butyl-hydroquinone.

References Cited

UNITED STATES PATENTS 3,213,114  10/1965  Braxton et al. _____ 260—625

OTHER REFERENCES

J. Chemical Society, Barnes et al. (1961), pp. 953–956 relied on.

LORRAINE A. WEINBERGER, Primary Examiner.

L. A. THAXTON, Assistant Examiner.

U.S. Cl. X.R.

260—625